(12) United States Patent
Tsuchida et al.

(10) Patent No.: US 10,140,361 B2
(45) Date of Patent: Nov. 27, 2018

(54) TEXT MINING DEVICE, TEXT MINING METHOD, AND COMPUTER-READABLE RECORDING MEDIUM

(71) Applicant: NEC Corporation, Minato-ku, Tokyo (JP)

(72) Inventors: Masaaki Tsuchida, Tokyo (JP); Kai Ishikawa, Tokyo (JP); Takashi Onishi, Tokyo (JP); Daniel Georg Andrade Silva, Tokyo (JP)

(73) Assignee: NEC CORPORATION, Tokyo (JP)

( * ) Notice: Subject to any disclaimer, the term of this patent is extended or adjusted under 35 U.S.C. 154(b) by 767 days.

(21) Appl. No.: 14/419,705

(22) PCT Filed: Aug. 23, 2013

(86) PCT No.: PCT/JP2013/072548
§ 371 (c)(1),
(2) Date: Feb. 5, 2015

(87) PCT Pub. No.: WO2014/034557
PCT Pub. Date: Mar. 6, 2014

(65) Prior Publication Data
US 2015/0205859 A1    Jul. 23, 2015

(30) Foreign Application Priority Data

Aug. 31, 2012  (JP) ................................ 2012-191067

(51) Int. Cl.
*G06F 17/30* (2006.01)
*G06F 17/27* (2006.01)

(52) U.S. Cl.
CPC .... *G06F 17/30684* (2013.01); *G06F 17/2705* (2013.01); *G06F 17/30719* (2013.01)

(58) Field of Classification Search
CPC ................................................ G06F 17/30598
See application file for complete search history.

(56) References Cited

U.S. PATENT DOCUMENTS

2010/0211380 A1    8/2010  Kanekiyo
2011/0153601 A1    6/2011  Nakazawa et al.
(Continued)

FOREIGN PATENT DOCUMENTS

| CN | 101808210 A | 8/2010 |
| JP | 2001075966 A | 3/2001 |

(Continued)

OTHER PUBLICATIONS

Chinese Office Action for CN Application No. 201380045560.2 dated May 3, 2017 with English Translation.
(Continued)

*Primary Examiner* — Grace Park (57) ABSTRACT

A text mining device (2) is used in which data composed of a set of records including an attribute value and text data is used as analysis target data. The text mining device (2) includes an analysis perspective candidate generation unit (20) that extracts an attribute value from the analysis target data and generates an analysis perspective candidate using the extracted attribute value, and a characteristic degree calculation unit (21) that compares text data in a record including the attribute value extracted as the analysis perspective candidate with text data in a record set that includes at least a record other than the record including the attribute value in the analysis target data, and calculates a characteristic degree indicating a relationship between the analysis perspective candidate and the analysis target data based on a result of the comparison.

9 Claims, 7 Drawing Sheets

(56) References Cited

U.S. PATENT DOCUMENTS

| | | | | |
|---|---|---|---|---|
| 2013/0054598 A1* | 2/2013 | Caceres | ............ | G06F 17/30303 |
| | | | | 707/737 |
| 2013/0173573 A1* | 7/2013 | Song | ................ | G06F 17/30864 |
| | | | | 707/706 |
| 2014/0006328 A1* | 1/2014 | Blanco | ................ | G06F 17/3087 |
| | | | | 706/46 |

FOREIGN PATENT DOCUMENTS

| | | | |
|---|---|---|---|
| JP | 2004164137 A | 6/2004 | |
| JP | 2004-246491 A | 9/2004 | |
| JP | 2010-061176 A | 3/2010 | |
| JP | 2011034457 A | 2/2011 | |
| JP | 2011198111 A | 10/2011 | |
| JP | 2012-093966 A | 5/2012 | |
| WO | 2007/069663 A1 | 6/2007 | |
| WO | 2010035455 A1 | 4/2010 | |

OTHER PUBLICATIONS

International Search Report for PCT Application No. PCT/JP2013/072548, dated Nov. 5, 2013.

Japanese Office Action for JP Application No. 2014-532977 dated Dec. 26, 2017 with English Translation.

* cited by examiner

QUESTIONNAIRE ABOUT PERSONAL COMPUTER

| ID | SEX | AGE GROUP | MARRIED | MAIN PURPOSE OF USE | MANUFACTURER | PRODUCT | DEGREE OF SATISFACTION | FREE DESCRIPTION (1) | FREE DESCRIPTION (2) |
|---|---|---|---|---|---|---|---|---|---|
| 1 | male | twenties | no | create documents | company A | personal computer B | high | ... | ... |
| 2 | female | thirties | yes | edit images | company A | personal computer B | middle | ... | ... |
| ... | ... | ... | ... | ... | ... | ... | ... | ... | ... |

TEXT MINING DEVICE, TEXT MINING METHOD, AND COMPUTER-READABLE RECORDING MEDIUM

This application is a National Stage Entry of PCT/JP2013/072548 filed on Aug. 23, 2013, which claims priority from Japanese Patent Application 2012-191067 filed on Aug. 31, 2012, the contents of all of which are incorporated herein by reference, in their entirety.

TECHNICAL FIELD

The present invention relates to a text mining system capable of providing useful knowledge to an analyst through analysis of text data. In particular, the present invention relates to a text mining device and a text mining method that propose perspectives of analysis to an analyst as useful knowledge, and to a computer-readable recording medium having recorded therein a program for realizing the same.

BACKGROUND ART

In general, in order to acquire useful knowledge through text mining, it is essential to conduct analysis from a variety of perspectives. For example, in text mining, clustering is performed with respect to target text data based on a certain perspective, and whether or not the content of text in a portion divided by the clustering is characteristic is determined. If the result of determination indicates that there is a characteristic portion, it leads to the discovery of useful knowledge.

Patent Document 1 discloses a conventional text mining system for performing such text mining. The text mining system disclosed in Patent Document 1 uses data composed of a plurality of records as analysis target data. Each of the records in the analysis target data includes attribute values and text data.

Once an analyst designates a certain attribute (for example, a job category), the text mining system disclosed in Patent Document 1 first extracts applicable records from the analysis target data using attribute values of the designated attribute (for example, a student, an employee, etc.), for each one of the attribute values. Here, the extracted records are referred to as a "subset".

Next, the text mining system disclosed in Patent Document 1 generates a plurality of text groups by applying text classification to text data in the analysis target data. Thereafter, for each one of the attribute values, the text mining system disclosed in Patent Document 1 indexes the association between the subset and the text groups, and displays information indicating the association between the subset and the text groups.

That is to say, according to the text mining system disclosed in Patent Document 1, by designating an attribute as a perspective of analysis, the analyst can review the association with the text groups for each one of the attribute values thereof. In other words, with use of such a text mining system, the analyst can set a commonly-known perspective and a perspective speculated from the analyst's experience or feelings, and conduct analysis based on the set perspectives.

CITATION LIST

Patent Document
Patent Document 1: JP 2004-164137A

DISCLOSURE OF THE INVENTION

Problem to be Solved by the Invention

However, in the text mining system disclosed in Patent Document 1, the analyst needs to set a perspective based on, for example, the experience or feelings by himself/herself, and therefore analysis tends to be conducted within a range of preconceptions of the analyst. For this reason, unless the analyst sets a perspective of analysis after trial and error, it would be difficult to efficiently set a perspective of analysis that leads to the discovery of knowledge that is unexpected but useful to the analyst.

Object of Invention

It is an object of the present invention to provide a text mining device, a text mining method, and a computer-readable recording medium that solve the aforementioned problem and enable efficient setting of a perspective of analysis that leads to the discovery of knowledge that is unexpected but useful to an analyst in text mining.

Means for Solving the Problem

In order to achieve the above object, a text mining device according to one aspect of the present invention uses, as analysis target data, data composed of a set of records including an attribute value and text data, and includes an analysis perspective candidate generation unit that extracts an attribute value from the analysis target data and generates an analysis perspective candidate using the extracted attribute value, and a characteristic degree calculation unit that compares text data in a record including the attribute value extracted as the analysis perspective candidate with text data in a record set that includes at least a record other than the record including the attribute value in the analysis target data, and calculates a characteristic degree indicating a relationship between the analysis perspective candidate and the analysis target data based on a result of the comparison.

Also, in order to achieve the above object, a text mining method according to one aspect of the present invention uses, as analysis target data, data composed of a set of records including an attribute value and text data, and includes (a) a step of extracting an attribute value from the analysis target data and generating an analysis perspective candidate using the extracted attribute value, and (b) a step of comparing text data in a record including the attribute value extracted as the analysis perspective candidate with text data in a record set that includes at least a record other than the record including the attribute value in the analysis target data, and calculating a characteristic degree indicating a relationship between the analysis perspective candidate and the analysis target data based on a result of the comparison.

Furthermore, in order to achieve the above object, a computer-readable recording medium according to one aspect of the present invention has recorded therein a program for performing, with a computer, text mining in which data composed of a set of records including an attribute value and text data is used as analysis target data, the program including an instruction for causing the computer to execute (a) a step of extracting an attribute value from the analysis target data and generating an analysis perspective candidate using the extracted attribute value, and (b) a step of comparing text data in a record including the attribute value extracted as the analysis perspective candidate with text data in a record set that includes at least a record other than the record including the attribute value in the analysis target data, and calculating a characteristic degree indicating a relationship between the analysis perspective candidate and the analysis target data based on a result of the comparison.

Effects of the Invention

As described above, the present invention enables efficient setting of a perspective of analysis that leads to the discovery of knowledge that is unexpected but useful to an analyst in text mining.

DESCRIPTION OF EMBODIMENTS (First Embodiment)

Figure 1:
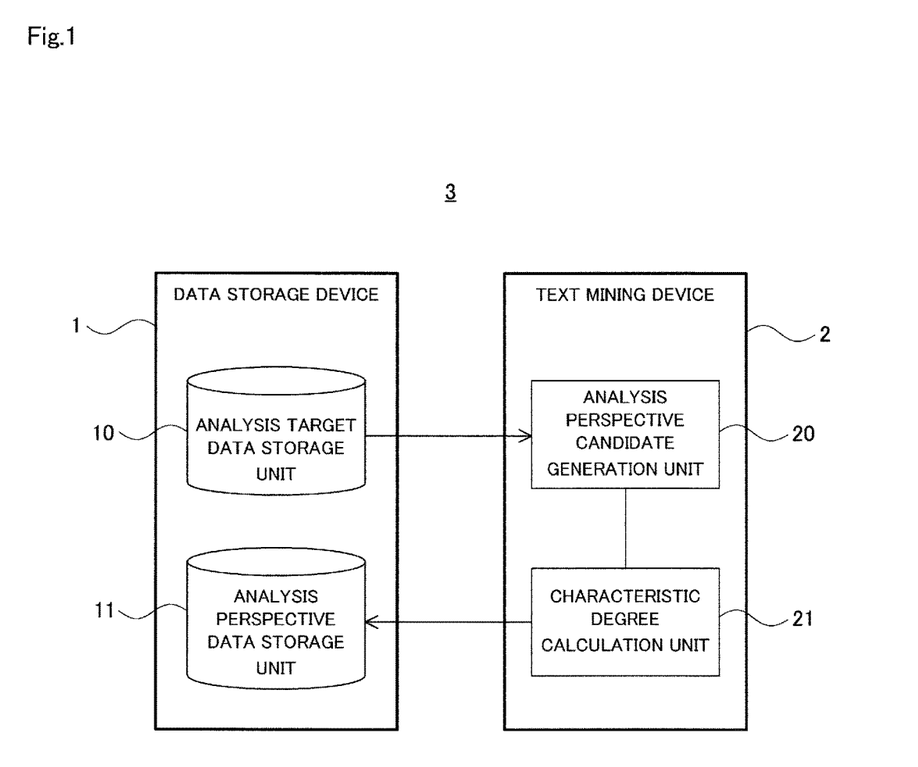
FIG. 1 is a block diagram showing a configuration of a text mining device according to a first embodiment of the present invention.
Figure 2:
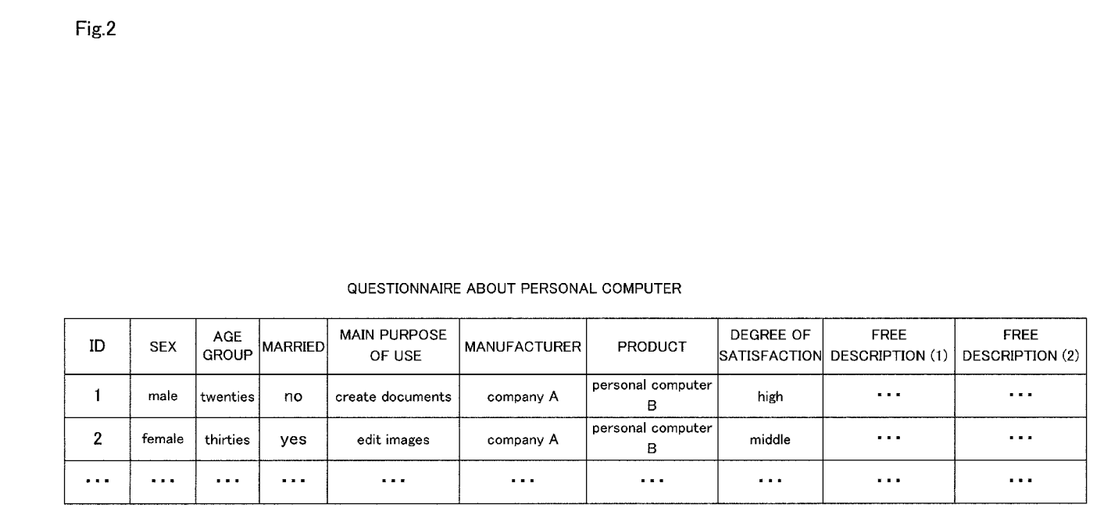
FIG. 2 shows one example of analysis target data used in the first embodiment of the present invention.
Figure 3:
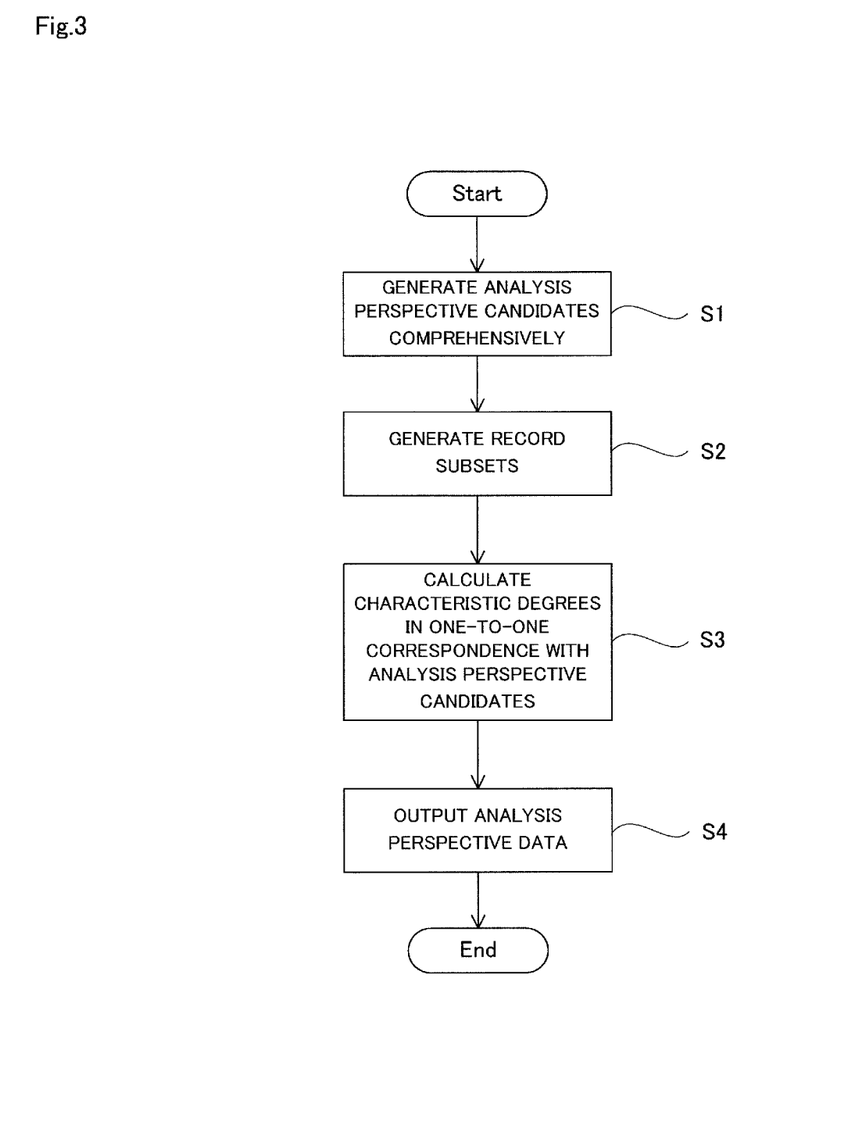
FIG. 3 is a flowchart showing the operations of the text mining device according to the first embodiment of the present invention.

The following describes a text mining device, a text mining method, and a program according to a first embodiment of the present invention with reference to FIGS. 1 to 3.

Device Configuration

First, a description is given of a configuration of the text mining device according to the present first embodiment with reference to FIG. 1. FIG. 1 is a block diagram showing the configuration of the text mining device according to the first embodiment of the present invention.

As shown in FIG. 1, a text mining device 2 according to the present first embodiment performs text mining using data that is composed of a set of records including attribute values and text data as analysis target data.

Also, as shown in FIG. 1, the text mining device 2 includes an analysis perspective candidate generation unit 20 and a characteristic degree calculation unit 21. Among these, the analysis perspective candidate generation unit 20 extracts an attribute value from the analysis target data, and generates an analysis perspective candidate using the extracted attribute value.

The characteristic degree calculation unit 21 first compares text data in records including the attribute value extracted as the analysis perspective candidate with text data in a record set that includes at least records other than the records including the attribute value in the analysis target data. Then, the characteristic degree calculation unit 21 calculates a characteristic degree indicating a relationship between the analysis perspective candidate and the analysis target data based on the result of comparison.

In this way, the text mining device 2 according to the present first embodiment mechanically extracts an attribute value that serves as analysis perspective candidate independent of the intensions of an analyst, and calculates a characteristic degree for this attribute value. Therefore, the analyst can identify an analysis perspective candidate that is unexpected but has a high characteristic degree, that is to say, an analysis perspective candidate that has a high possibility of enabling the discovery of useful knowledge. The text mining device 2 thus enables efficient setting of a perspective of analysis that leads to the discovery of knowledge that is unexpected but useful to the analyst in text mining.

A configuration of the text mining device 2 according to the present first embodiment will now be described in more detail with reference to FIG. 2. FIG. 2 shows one example of analysis target data used in the first embodiment of the present invention.

As shown in FIG. 1, in the present first embodiment, the text mining device 2 is connected to a data storage device 1, and constitutes a text mining system 3 together with the data storage device 1. The data storage device 1 includes an analysis target data storage unit 10 and an analysis perspective data storage unit 11.

The analysis target data storage unit 10 stores the analysis target data. In the example of FIG. 2, the analysis target data is a result of a questionnaire about a personal computer. Also, in the example of FIG. 2, records that compose the analysis target data each include attribute values of seven types of attributes (sex, age group, married, main purpose of use, manufacturer, product, and degree of satisfaction), and two types of text data pertaining to different text attributes (free description (1), free description (2)). It should be noted that, in the present embodiment, no particular limitation is imposed on the number of types of attributes and the number of types of text data in the analysis target data.

Also, the analysis perspective data storage unit 11 stores analysis perspective data output by the text mining device 2. In the present embodiment, the analysis perspective data is composed of characteristic degrees that are calculated in one-to-one correspondence with analysis perspective candidates.

Also, in the present first embodiment, the analysis perspective candidate generation unit 20 may extract one attribute value from the analysis target data and generate an analysis perspective candidate using only the extracted attribute value, and may extract a plurality of attribute values and generate an analysis perspective candidate using the plurality of attribute values. Specifically, in the example of FIG. 3, the analysis perspective candidate generation unit 20 may generate an analysis perspective candidate that includes only "male", and may generate an analysis perspective candidate that includes a combination "male, twenties".

Furthermore, in the present first embodiment, after the analysis perspective candidate generation unit 20 generates an analysis perspective candidate, it identifies records including an attribute value extracted as the analysis perspective candidate and generates a set of identified records (hereinafter referred to as a "record subset"). It should be noted that the number of records that include the attribute value extracted as the analysis perspective candidate may be one. In this case, a record subset is composed of only one record.

Also, in the present first embodiment, it is sufficient for the "record set that includes at least records other than the records including the attribute value in the analysis target data" to include at least one record other than the records including the attribute value. This record set may be all records in the analysis target data, and may be a set of records randomly selected from among all records in the analysis target data. Furthermore, the "record set that includes at least records other than the records including the attribute value in the analysis target data" may be a set of records that have been selected based on a preset perspective of analysis.

Device Operations

A description is now given of the operations of the text mining device 2 according to the first embodiment of the present invention with reference to FIG. 3. FIG. 3 is a flowchart showing the operations of the text mining device according to the first embodiment of the present invention. In the following description, FIGS. 1 and 2 will be referred to as appropriate. Also, in the present first embodiment, the text mining method is implemented by causing the text mining device 2 to operate. Therefore, the following description of the operations of the text mining device 2 applies to the text mining method according to the present first embodiment.

As shown in FIG. 3, the analysis perspective candidate generation unit 20 first reads the analysis target data from the analysis target data storage unit 10, and generates analysis perspective candidates by obtaining attribute values that serve as the analysis perspective candidates from the read analysis target data (step S1). At this time, a single attribute value or a combination of two or more attribute values may be obtained as one analysis perspective candidate.

Also, in the present first embodiment, in step S1, the analysis perspective candidate generation unit 20 retrieves all possible combinations of attribute values from each one of the records composing the analysis target data, and uses all of the retrieved combinations as analysis perspective candidates. In this case, analysis perspective candidates are listed that enable generation of record subsets including at least one record.

For example, in the example of FIG. 2, based on a combination of attributes "sex, age group", the analysis perspective candidate generation unit 20 generates an analysis perspective candidate "male, twenties" from the record with ID 1, and generates an analysis perspective candidate "female, thirties" from the record with ID 2. The analysis perspective candidates thus generated serve as elements of a record subset generated in later-described step S2.

Also, in step S1, in order to reduce the volume of analysis perspective candidates to be listed, the analysis perspective candidate generation unit 20 may restrict the number of attribute values to be combined, and may eliminate analysis perspective candidates for which the number of applicable records is neither larger than nor equal to a certain number.

Next, for each one of the analysis perspective candidates obtained in step S1, the analysis perspective candidate generation unit 20 identifies records that include the analysis perspective candidate as an element and further generates a set of identified records (record subset) (step S2). The analysis perspective candidate generation unit 20 also outputs the record subsets to the characteristic degree calculation unit 21.

In step S2, the analysis perspective candidate generation unit 20 can further determine whether or not there is a certain similarity relationship between the records (record subset) identified for one analysis perspective candidate and the records (record subset) identified for another analysis perspective candidate. If the result of determination indicates that there is a certain similarity relationship, the analysis perspective candidate generation unit 20 can merge one analysis perspective candidate and another analysis perspective candidate.

Here, one example of a method for margining a plurality of analysis perspective candidates is a method in which a union or an intersection of attribute values included in the analysis perspective candidates to be merged is found and used as a new analysis perspective candidate. Another example of a method for merging a plurality of analysis perspective candidates is a method in which only one of the analysis perspective candidates to be merged is left and the rest is deleted. It should be noted that, in a case where the method involving the deletion is adopted, the analysis perspective candidate generation unit 20 may leave only an analysis perspective candidate with the highest characteristic degree and delete the rest after the execution of later-described step S3.

It is often the case that there is no substantial difference among the trends of the contents of text data in similar record subsets. Therefore, the above merger of analysis perspective candidates is effective in reducing the redundancy at the time of presentation of analysis perspective candidates to the analyst. Also, if analysis perspective candidates with similar record subsets are presented collectively as perspectives of analysis exhibiting the same trend, the efficiency of analysis by the analyst is improved.

Next, for each one of the analysis perspective candidates, the characteristic degree calculation unit 21 compares text data in the record subset generated in step S2 with a record set that includes at least records other than the records identified in step S2 including the attribute value, and calculates a characteristic degree indicating a relationship between the analysis perspective candidate and the analysis target data based on the result of comparison (step S3). It should be noted that, in the description of FIG. 3, the "record set that includes at least records other than the records identified in step S2 including the attribute value" is assumed to be "all records in the analysis target data", and the following describes an example in which "all records in the analysis target data" are used.

In step S3, for example, the characteristic degree calculation unit 21 calculates a characteristic degree such that the more the trend of the content of text data in a record subset differs from the trend of the content of text data in all records, the larger the value of the characteristic degree is.

In the present first embodiment, with respect to each one of the records in the analysis target data, the characteristic degree calculation unit 21 first divides entire text data in the record into topics by applying text clustering, which is an existing technique, to the entire text data. Then, the characteristic degree calculation unit 21 finds a topic distribution in text data in the record subset of each analysis perspective candidate and a topic distribution in text data in all records in the analysis target data. The characteristic degree calculation unit 21 can calculate a characteristic degree based on non-similarity between the found topic distributions. In a case where a characteristic degree is calculated in the above-described manner, a topic distribution in the entirety is compared with a topic distribution related to a specific analysis perspective candidate, and therefore an overall difference between the trends is calculated as a characteristic degree.

Specifically, for example, assume that entire text data is divided into three topics T1, T2, T3 through text clustering, frequency distributions x of the topics in a record subset for an analysis perspective candidate A are "T1: 10%, T2: 30%, T3: 60%", and frequency distributions y of the topics in the entire records are "T1: 20%, T2: 20%, T3: 60%".

In a case where a reciprocal of a cosine similarity degree is used as a characteristic degree, a characteristic degree of 1.02 is calculated in accordance with the following Expression 1. It should be noted that a reciprocal is used as a characteristic degree because a cosine similarity degree of a larger value indicates more identical trends, that is to say, more similarity.

$$\text{Characteristic degree}=1/(x\cdot y/|x||y|) \quad \text{(Expression 1)}$$

On the other hand, in a case where frequency distributions of the topics in a record subset for an analysis perspective candidate B are "T1: 60%, T2: 20%, T3: 30%", a characteristic degree of 1.57 is calculated in accordance with the above Expression 1. In this case, as the characteristic degree for the analysis perspective candidate B is higher than the characteristic degree for the analysis perspective candidate A, it is considered that the analysis perspective candidate B leads to the discovery of useful knowledge more easily than the analysis perspective candidate A.

Furthermore, instead of the cosine similarity degree, a reciprocal of any similarity degree that can be calculated from frequency distribution vectors, or a distance that can be similarly calculated from frequency distribution vectors, can be used as a characteristic degree.

Also, the characteristic degree calculation unit 21 can calculate a characteristic degree by performing a statistical test in which the null hypothesis holds when a topic appearance ratio of the analysis perspective candidate A and a topic appearance ratio of all records are the same, such that the smaller the p-value thereof, the larger the value of the characteristic degree. A chi-squared test, a G-test which is a type of a likelihood ratio test, and the like can be used as the statistical test.

In another example, in step S3, the characteristic degree calculation unit 21 identifies, for each one of topics, a set of records including the topic from the entire records after text clustering. Then, the characteristic degree calculation unit 21 calculates a degree of similarity between an identified per-topic set and a record subset for each analysis perspective candidate. The characteristic degree calculation unit 21 can calculate a characteristic degree using this degree of similarity. In this example, a characteristic degree indicates the result of comparison between the entire records and a record subset for an analysis perspective candidate in relation to a specific topic.

Specifically, for example, assume that, among the entire records, the number of records including topic T1 is 1000, and the numbers of records in record subsets for two analysis perspective candidates C and D are 500 and 700, respectively. Also assume that, among the record subsets for the analysis perspective candidates C and D, the number of records including topic T1 and the number of mutual records are 400 and 200, respectively.

In this case, using Dice's coefficient, a characteristic degree for the analysis perspective candidate C in relation to topic T1 is 0.53 (=2×400/(1000+500)). On the other hand, a characteristic degree for the analysis perspective candidate D in relation to topic T1 is 0.24 (=2×200/(1000+700)). It should be noted that, in this case, a characteristic degree can be calculated using any method for calculating a degree of similarity between sets of records instead of Dice's coefficient.

The characteristic degree calculation unit 21 can also extract characteristic words from a record subset for an analysis perspective candidate and calculate a characteristic degree using the result of extraction of the characteristic words, for example, scores (e.g., frequencies of appearance) of the extracted characteristic words. Specifically, the characteristic degree calculation unit 21 can identify N characteristic words from the extracted characteristic words, in descending order of score values, and use a sum of the scores of the identified characteristic words as a characteristic degree.

Furthermore, the characteristic degree calculation unit 21 can extract characteristic words from both of a record subset for an analysis perspective candidate and all records in the analysis target data, calculate a degree of similarity between the extracted characteristic words, and calculate a characteristic degree using this degree of similarity.

Specifically, the characteristic degree calculation unit 21 first extracts N characteristic words, in descending order of score values, from both of a record subset for an analysis perspective candidate and all records in the analysis target data. Subsequently, the characteristic degree calculation unit 21 calculates a degree of similarity between sets of N extracted characteristic words. The characteristic degree calculation unit 21 can calculate a characteristic degree using this degree of similarity, such that the lower the degree of similarity, the larger the value of the characteristic degree.

The above has described two examples that utilize extraction of characteristic words in calculation of a characteristic degree. While these examples are advantageous in that it is unnecessary to set parameters required for text clustering, they make it difficult to comprehend trends on a topic-by-topic basis.

Furthermore, similarly to the above-described method based on a topic appearance ratio, the characteristic degree calculation unit 21 can calculate a characteristic degree by performing a statistical test in which the null hypothesis holds when a characteristic word appearance ratio of the analysis perspective candidate A and a characteristic word appearance ratio of all records are the same, such that the smaller the p-value thereof, the larger the value of the characteristic degree.

Next, the characteristic degree calculation unit 21 outputs the characteristic degrees that have been calculated in one-to-one correspondence with the analysis perspective candidates in step S3 to the analysis perspective data storage unit 11 as analysis perspective data (step S4). Once step S4 has been executed, the analysis perspective data storage unit 11 stores the analysis perspective data. After the execution of step S4, processing of the text mining device 2 is ended. It should be noted that, in the present first embodiment, the analysis perspective data is a combination of analysis perspective candidates and characteristic degrees therefor.

Program

It is sufficient for the program according to the first embodiment of the present invention to cause a computer to execute steps S1 to S4 shown in FIG. 3. The text mining device 2 and the text mining method according to the present first embodiment can be realized by installing this program in the computer and executing the installed program. In this case, a CPU (Central Processing Unit) of the computer functions as the analysis perspective candidate generation unit 20 and the characteristic degree calculation unit 21, and executes processing accordingly.

Also, in the present first embodiment, the data storage device 1 can be realized by a storage device, such as a hard disk, provided in the computer in which the program according to the present first embodiment is installed. Furthermore, the data storage device 1 may be realized by a storage device of another computer that is connected, via a network and the like, to the computer in which the program according to the present first embodiment is installed.

Effects of First Embodiment

As described above, in the present first embodiment, analysis perspective candidates are automatically set from analysis target data without depending on the experience and feelings of the analyst. Therefore, the present first embodiment enables efficient setting of perspectives of analysis that include perspectives of analysis unexpected to the analyst and that have a high possibility of yielding characteristic results.

(Second Embodiment)

Figure 4:
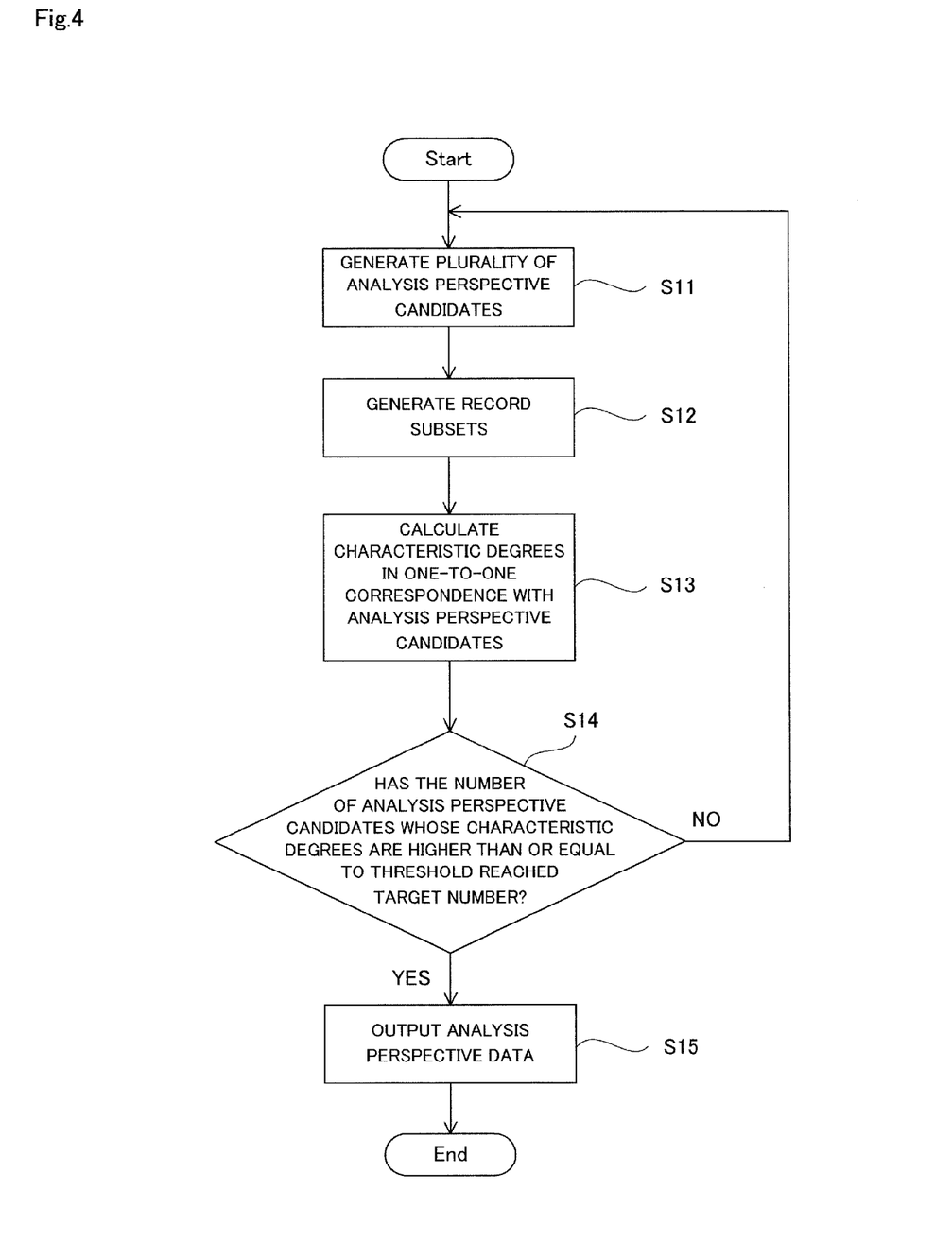
FIG. 4 is a flowchart showing the operations of a text mining device according to a second embodiment of the present invention.

The following describes a text mining device, a text mining method, and a program according to a second embodiment of the present invention with reference to FIG. 4.

The text mining device according to the present second embodiment has a configuration similar to the configuration of the text mining device 1 according to the first embodiment shown in FIG. 1, but is different therefrom in analysis perspective candidates and the operations of the characteristic degree calculation unit. With reference to FIG. 4, the following describes differences from the first embodiment while providing a description of the operations of the text mining device according to the present second embodiment.

FIG. 4 is a flowchart showing the operations of the text mining device according to the second embodiment of the present invention. It should be noted that, in the following description, FIGS. 1 and 2 used in the first embodiment will be referred to as appropriate, and reference signs used in FIG. 1 will be used. In the present second embodiment also, the text mining method is implemented by causing the text mining device to operate.

As shown in FIG. 4, the analysis perspective candidate generation unit 20 first reads the analysis target data from the analysis target data storage unit 10, and generates analysis perspective candidates by obtaining attribute values that serve as the analysis perspective candidates from the read analysis target data (step S11). It should be noted that, in step S11, analysis perspective candidates are not comprehensively listed as in step S1 according to the first embodiment shown in FIG. 3. In step S11, a plurality of analysis perspective candidates are randomly generated.

Next, for each one of the analysis perspective candidates obtained in step S11, the analysis perspective candidate generation unit 20 identifies records that include the analysis perspective candidate as an element and further generates a set of identified records (record subset) (step S12). Step S12 is similar to step S2 shown in FIG. 3. The analysis perspective candidate generation unit 20 also outputs the record subsets to the characteristic degree calculation unit.

Next, for each one of the analysis perspective candidates, the characteristic degree calculation unit 21 compares text data in the record subset generated in step S12 with a record set that includes at least records other than the records identified in step S12 including the attribute value, and calculates a characteristic degree indicating a relationship between the analysis perspective candidate and the analysis target data based on the result of comparison (step S13). Step S13 is similar to step S3 shown in FIG. 3. In the present second embodiment also, the "record set that includes at least records other than the records identified in step S12 including the attribute value" is assumed to be "all records in the analysis target data", and the following describes an example in which "all records in the analysis target data" are used.

Next, the characteristic degree calculation unit 21 counts the number of analysis perspective candidates whose characteristic degrees calculated in step S13 are higher than or equal to a preset threshold, and determines whether or not the counted number has reached a target number (step S14).

If the result of determination in step S14 indicates that the counted number has not reached the target number, the characteristic degree calculation unit 21 causes the analysis perspective candidate generation unit 20 to execute step S11 again. That is to say, generation of analysis perspective candidates and calculation of characteristic degrees are repeated until a certain number or more of analysis perspective candidates that are considered to have at least a certain level of characteristics are found through determination in step S14.

On the other hand, if the result of determination in step S14 indicates that the counted number has reached the target number, the characteristic degree calculation unit 21 outputs the characteristic degrees that have been calculated in one-to-one correspondence with the analysis perspective candidates in step S13 to the analysis perspective data storage unit 11 as analysis perspective data (step S15). After the execution of step S15, processing of the text mining device is ended. Step S15 is similar to step S4 shown in FIG. 3.

Program

It is sufficient for the program according to the second embodiment of the present invention to cause a computer to execute steps S11 to S15 shown in FIG. 4. The text mining device and the text mining method according to the present second embodiment can be realized by installing this program in the computer and executing the installed program. In this case, a CPU (Central Processing Unit) of the computer functions as the analysis perspective candidate generation unit 20 and the characteristic degree calculation unit 21, and executes processing accordingly.

In the present second embodiment also, the data storage device 1 can be realized by a storage device, such as a hard disk, provided in the computer in which the program according to the present second embodiment is installed. Furthermore, the data storage device may be realized by a storage device of another computer that is connected, via a network and the like, to the computer in which the program according to the present second embodiment is installed.

Effects of Second Embodiment

As described above, in the present second embodiment, the number of analysis perspective candidates is restricted. This is useful in a case where there are numerous types of attributes and attribute values thereof and it is difficult to list analysis perspective candidates ahead of time in terms of a time period of calculation and a storage capacity. The present second embodiment enables reduction a time period of calculation and a required storage capacity. With use of the present second embodiment, the effects similar to those achieved by the first embodiment can be achieved.

(Third Embodiment)

Figure 5:
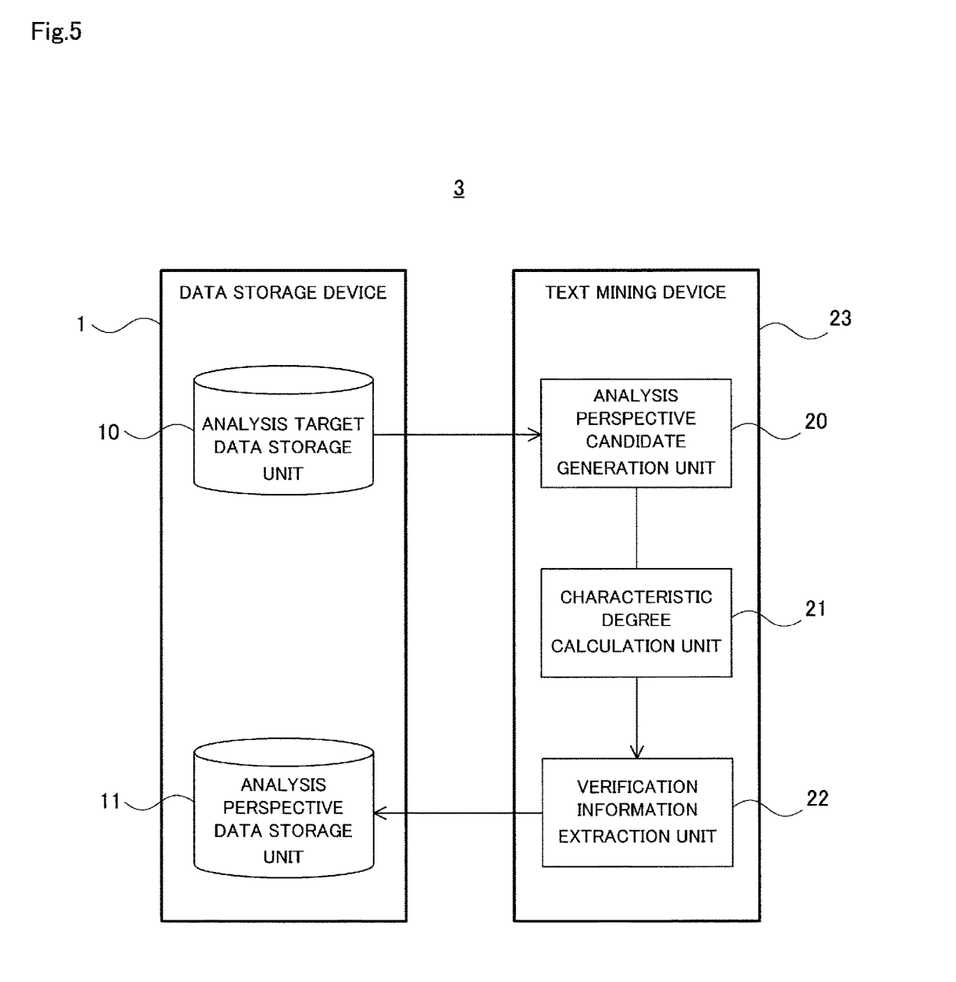
FIG. 5 is a block diagram showing a configuration of a text mining device according to a third embodiment of the present invention.
Figure 6:
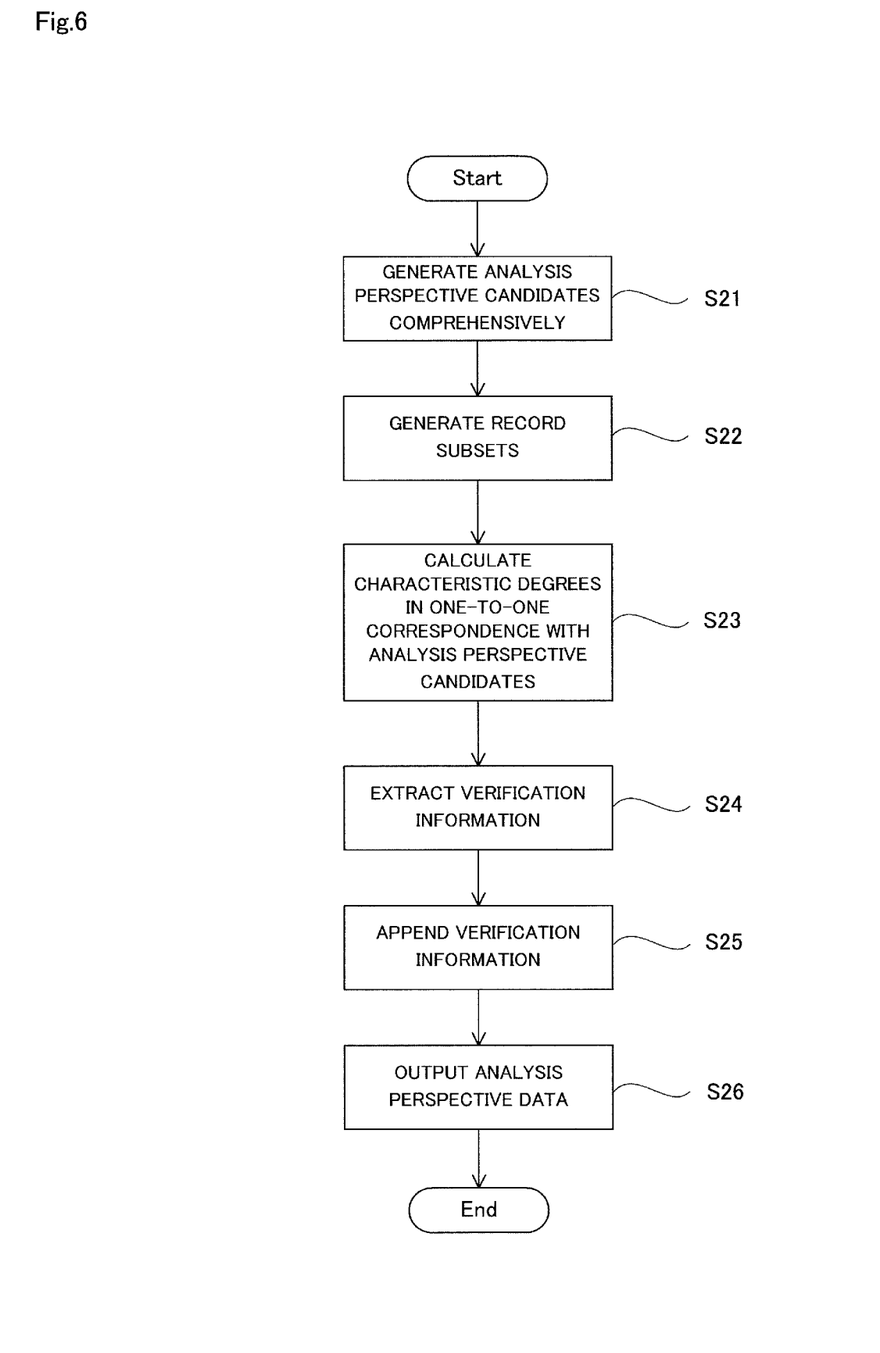
FIG. 6 is a flowchart showing the operations of the text mining device according to the third embodiment of the present invention.

The following describes a text mining device, a text mining method, and a program according to a third embodiment of the present invention with reference to FIGS. 5 and 6.

Device Configuration

First, a description is given of a configuration of the text mining device according to the present third embodiment with reference to FIG. 5. FIG. 5 is a block diagram showing the configuration of the text mining device according to the third embodiment of the present invention.

As shown in FIG. 5, a text mining device 23 according to the present third embodiment differs from the text mining device 2 according to the first embodiment shown in FIG. 1 in including a verification information extraction unit 22 in addition to the analysis perspective candidate generation unit 20 and the characteristic degree calculation unit 21.

In other respects, the text mining device 23 is configured in a manner similar to the text mining device 2 according to the first embodiment shown in FIG. 1. The analysis perspective candidate generation unit 20 and the characteristic degree calculation unit 21 shown in FIG. 5 are the same functional blocks as the analysis perspective candidate generation unit 20 and the characteristic degree calculation unit 21 shown in FIG. 1. The following description centers on differences from the first embodiment.

First, the verification information extraction unit 22 extracts, from text data in records (a record subset) including an attribute value extracted as an analysis perspective candidate, one or both of a characteristic word and representative text as verification information for the analysis perspective candidate. It should be noted that, in the present third embodiment, any disclosed technique is used as a technique to extract a characteristic word or representative text from text data.

Subsequently, the verification information extraction unit 22 appends the extracted verification information to the analysis perspective candidate. The verification information extraction unit 22 also causes the analysis perspective data storage unit 11 to store the analysis perspective candidate appended with the verification information.

Device Operations

A description is now given of the operations of the text mining device 23 according to the third embodiment of the present invention with reference to FIG. 6. FIG. 6 is a flowchart showing the operations of the text mining device according to the third embodiment of the present invention. In the following description, FIG. 5 will be referred to as appropriate. In the present third embodiment also, the text mining method is implemented by causing the text mining device 23 to operate. Therefore, the following description of the operations of the text mining device 23 applies to the text mining method according to the present third embodiment.

As shown in FIG. 6, the analysis perspective candidate generation unit 20 first reads the analysis target data from the analysis target data storage unit 10, and generates analysis perspective candidates by obtaining attribute values that serve as the analysis perspective candidates from the read analysis target data (step S21).

Next, for each one of the analysis perspective candidates obtained in step S21, the analysis perspective candidate generation unit 20 identifies records that include the analysis perspective candidate as an element and further generates a set of identified records (record subset) (step S22).

Next, for each one of the analysis perspective candidates, the characteristic degree calculation unit 21 compares text data in the record subset generated in step S22 with a record set that includes at least records other than the records identified in step S22 including the attribute value, and calculates a characteristic degree indicating a relationship between the analysis perspective candidate and the analysis target data based on the result of comparison (step S23). In the present third embodiment also, the "record set that includes at least records other than the records identified in step S22 including the attribute value" is assumed to be "all records in the analysis target data", and the following describes an example in which "all records in the analysis target data" are used.

The foregoing steps S21 to S23 are similar to steps S1 to S3 shown in FIG. 3. Once steps S21 to S23 have been executed, the verification information extraction unit 22 extracts, from text data in the record subsets, one or both of a characteristic word and representative text as verification information for the analysis perspective candidates (step S24).

Next, the verification information extraction unit 22 appends the verification information extracted in step S24 to the analysis perspective candidates (step S25). Then, the verification information extraction unit 22 outputs the analysis perspective candidates appended with the verification information, as well as the characteristic degrees calculated in step S23, as analysis perspective data to the analysis perspective data storage unit 11 (step S26).

Once step S26 has been executed, the analysis perspective data storage unit 11 stores the analysis perspective data. After the execution of step S26, processing of the text mining device 23 is ended. It is sufficient for execution timings of steps S24 and S25 to take place after generation of the analysis perspective candidates, and no particular limitation is intended in this regard.

Program

It is sufficient for the program according to the third embodiment of the present invention to cause a computer to execute steps S21 to S26 shown in FIG. 6. The text mining device and the text mining method according to the present third embodiment can be realized by installing this program in the computer and executing the installed program. In this case, a CPU (Central Processing Unit) of the computer functions as the analysis perspective candidate generation unit 20, the characteristic degree calculation unit 21, and the verification information extraction unit 22, and executes processing accordingly.

In the present third embodiment also, the data storage device 1 can be realized by a storage device, such as a hard disk, provided in the computer in which the program according to the present third embodiment is installed. Furthermore, the data storage device 1 may be realized by a storage device of another computer that is connected, via a network and the like, to the computer in which the program according to the present third embodiment is installed.

Effects of Third Embodiment

As described above, in the present third embodiment, information for verifying whether or not an analysis perspective candidate is promising (verification information) is provided, and the analyst can easily comprehend the characteristics of a presented analysis perspective candidate. In other words, the provided information enables the analyst to forecast whether or not meaningful results can be yielded in a case where the analysis is conducted using the analysis perspective candidate. Therefore, the present third embodiment enables more efficient setting of perspectives of analysis that have a high possibility of yielding characteristic results, including perspectives of analysis that are unexpected to the analyst.

Specific Configuration

Figure 7:
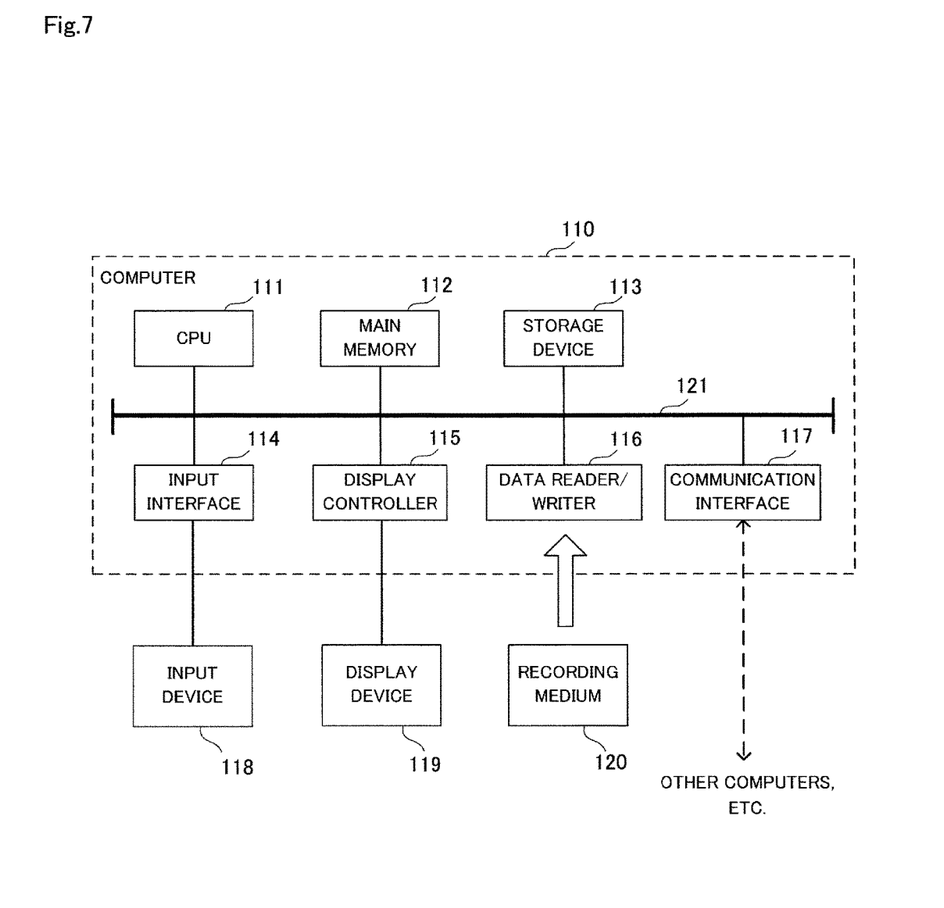
FIG. 7 is a block diagram showing one example of a computer that realizes the text mining devices according to the first to third embodiments of the present invention.

A description is now given of a computer that realizes a text mining device by executing the programs according to the first to third embodiments with reference to FIG. 7. FIG. 7 is a block diagram showing one example of a computer that realizes the text mining devices according to the first to third embodiments of the present invention.

As shown in FIG. 7, a computer 110 includes a CPU 111, a main memory 112, a storage device 113, an input interface 114, a display controller 115, a data reader/writer 116, and a communication interface 117. These components are connected in such a manner that they can perform data communication with one another via a bus 121.

The CPU 111 executes various types of operations by deploying programs (codes) according to the present embodiments stored in the storage device 113 to the main memory 112, and executing the deployed programs in a predetermined order. The main memory 112 is typically a volatile storage device such as a DRAM (Dynamic Random Access Memory). The programs are provided while being stored in a computer-readable recording medium 120. The programs may be distributed over the Internet connected via the communication interface 117.

Specific examples of the storage device 113 include a hard disk drive and a semiconductor storage device such as a flash memory. The input interface 114 mediates data transmission between the CPU 111 and an input device 118 such as a keyboard and a mouse. The display controller 115 is connected to a display device 119 and controls display on the display device 119. The data reader/writer 116 mediates data transmission between the CPU 111 and the recording medium 120. The data reader/writer 116 reads the programs from the recording medium 120, and writes the result of processing in the computer 110 into the recording medium 120. The communication interface 117 mediates data transmission between the CPU 111 and other computers.

Specific examples of the recording medium 120 include a general-purpose semiconductor storage device such as a CF (Compact Flash, registered trademark) and an SD (Secure Digital), a magnetic storage medium such as a flexible disk, and an optical storage medium such as a CD-ROM (Compact Disc Read Only Memory).

A part or all of the above embodiments can be described as, but are not limited to, the following Notes 1 to 30.

(Note 1)

A text mining device that uses, as analysis target data, data composed of a set of records including an attribute value and text data, and includes an analysis perspective candidate generation unit that extracts an attribute value from the analysis target data and generates an analysis perspective candidate using the extracted attribute value, and a characteristic degree calculation unit that compares text data in a record including the attribute value extracted as the analysis perspective candidate with text data in a record set that includes at least a record other than the record including the attribute value in the analysis target data, and calculates a characteristic degree indicating a relationship between the analysis perspective candidate and the analysis target data based on a result of the comparison.

(Note 2)

The text mining device according to note 1, wherein the analysis perspective candidate generation unit extracts a plurality of attribute values from the analysis target data, and generates the analysis perspective candidate using the plurality of attribute values extracted.

(Note 3)

The text mining device according to note 1 or 2, wherein the characteristic degree calculation unit finds a topic distribution in the text data in the record including the attribute value extracted as the analysis perspective candidate and a topic distribution in the text data in the record set that includes at least the record other than the record including the attribute value in the analysis target data, and calculates the characteristic degree such that the more the found topic distributions differ from each other, the larger a value of the characteristic degree is.

(Note 4)

The text mining device according to any one of notes 1 to 3, wherein the characteristic degree calculation unit calculates a degree of similarity between the text data in the record including the attribute value extracted as the analysis perspective candidate and the text data in the record set that includes at least the record other than the record including the attribute value in the analysis target data, and calculates the characteristic degree using the degree of similarity.

(Note 5)

The text mining device according to note 1 or 2, wherein the characteristic degree calculation unit extracts a characteristic word from the record including the attribute value extracted as the analysis perspective candidate, and calculates the characteristic degree using a score of the extracted characteristic word.

(Note 6)

The text mining device according to note 1 or 2, wherein the characteristic degree calculation unit extracts a characteristic word from both of the record including the attribute value extracted as the analysis perspective candidate and the record set that includes at least the record other than the record including the attribute value in the analysis target data, calculates a degree of similarity between the extracted characteristic words, and calculates the characteristic degree using the degree of similarity.

(Note 7)

The text mining device according to any one of notes 1 to 6, wherein the analysis perspective candidate generation unit generates a plurality of analysis perspective candidates, identifies, for each one of the plurality of analysis perspective candidates, a record that includes the attribute value extracted as the analysis perspective candidate, determines whether or not there is a certain similarity relationship between a record identified for one analysis perspective candidate and a record identified for another analysis perspective candidate, and merges the one analysis perspective candidate and the other analysis perspective candidate if a result of the determination indicates that there is the certain similarity relationship.

(Note 8)

The text mining device according to any one of notes 1 to 7, further comprising a verification information extraction unit that extracts, from the text data in the record including the attribute value extracted as the analysis perspective candidate, one or both of a characteristic word and representative text as verification information for the analysis perspective candidate, and appends the extracted verification information to the analysis perspective candidate.

(Note 9)

The text mining device according to note 1 or 2, wherein the characteristic degree calculation unit performs a statistical test in which a null hypothesis holds when an appearance ratio of a topic that appears in the text data in the record including the attribute value extracted as the analysis perspective candidate is the same as an appearance ratio of a topic that appears in the text data in the record set that includes at least the record other than the record including the attribute value in the analysis target data, and calculates the characteristic degree such that the smaller a p-value obtained through the statistical test, the larger a value of the characteristic degree.

(Note 10)

The text mining device according to note 1 or 2, wherein the characteristic degree calculation unit performs a statistical test in which a null hypothesis holds when an appearance ratio of a characteristic word that appears in the text data in the record including the attribute value extracted as the analysis perspective candidate is the same as an appearance ratio of a characteristic word that appears in the text data in the record set that includes at least the record other than the record including the attribute value in the analysis target data, and calculates the characteristic degree such that the smaller a p-value obtained through the statistical test, the larger a value of the characteristic degree.

(Note 11)

A text mining method that uses, as analysis target data, data composed of a set of records including an attribute value and text data, and includes (a) a step of extracting an attribute value from the analysis target data and generating an analysis perspective candidate using the extracted attribute value, and (b) a step of comparing text data in a record including the attribute value extracted as the analysis perspective candidate with text data in a record set that includes at least a record other than the record including the attribute value in the analysis target data, and calculating a characteristic degree indicating a relationship between the analysis perspective candidate and the analysis target data based on a result of the comparison.

(Note 12)

The text mining method according to note 11, wherein in step (a), a plurality of attribute values are extracted from the analysis target data, and the analysis perspective candidate is generated using the plurality of attribute values extracted.

(Note 13)

The text mining method according to note 11 or 12, wherein in step (b), a topic distribution in the text data in the record including the attribute value extracted as the analysis perspective candidate, as well as a topic distribution in the text data in the record set that includes at least the record other than the record including the attribute value in the analysis target data, is found, and the characteristic degree is calculated such that the more the found topic distributions differ from each other, the larger a value of the characteristic degree is.

(Note 14)

The text mining method according to any one of notes 11 to 13, wherein in step (b), a degree of similarity between the text data in the record including the attribute value extracted as the analysis perspective candidate and the text data in the record set that includes at least the record other than the record including the attribute value in the analysis target data is calculated, and the characteristic degree is calculated using the degree of similarity.

(Note 15)

The text mining method according to note 11 or 12, wherein in step (b), a characteristic word is extracted from the record including the attribute value extracted as the analysis perspective candidate, and the characteristic degree is calculated using a score of the extracted characteristic word.

(Note 16)

The text mining method according to note 11 or 12, wherein in step (b), a characteristic word is extracted from both of the record including the attribute value extracted as the analysis perspective candidate and the record set that includes at least the record other than the record including the attribute value in the analysis target data, a degree of similarity between the extracted characteristic words is calculated, and the characteristic degree is calculated using the degree of similarity.

(Note 17)

The text mining method according to any one of notes 11 to 16, wherein in step (a), a plurality of analysis perspective candidates are generated, and for each one of the plurality of analysis perspective candidates, a record that includes the attribute value extracted as the analysis perspective candidate is identified, furthermore, whether or not there is a certain similarity relationship between a record identified for one analysis perspective candidate and a record identified for another analysis perspective candidate is determined, and the one analysis perspective candidate and the other analysis perspective candidate are merged if a result of the determination indicates that there is the certain similarity relationship.

(Note 18)

The text mining method according to any one of notes 11 to 17, further comprising (c) a step of extracting, from the text data in the record including the attribute value extracted as the analysis perspective candidate, one or both of a characteristic word and representative text as verification information for the analysis perspective candidate, and appending the extracted verification information to the analysis perspective candidate.

(Note 19)

The text mining method according to note 11 or 12, wherein in step (b), a statistical test is performed in which a null hypothesis holds when an appearance ratio of a topic that appears in the text data in the record including the attribute value extracted as the analysis perspective candidate is the same as an appearance ratio of a topic that appears in the text data in the record set that includes at least the record other than the record including the attribute value in the analysis target data, and the characteristic degree is calculated such that the smaller a p-value obtained through the statistical test, the larger a value of the characteristic degree.

(Note 20)

The text mining method according to note 11 or 12, wherein in step (b), a statistical test is performed in which a null hypothesis holds when an appearance ratio of a characteristic word that appears in the text data in the record including the attribute value extracted as the analysis perspective candidate is the same as an appearance ratio of a characteristic word that appears in the text data in the record set that includes at least the record other than the record including the attribute value in the analysis target data, and the characteristic degree is calculated such that the smaller a p-value obtained through the statistical test, the larger a value of the characteristic degree.

(Note 21)

A computer-readable recording medium having recorded therein a program for performing, with a computer, text mining in which data composed of a set of records including an attribute value and text data is used as analysis target data, the program including an instruction for causing the computer to execute (a) a step of extracting an attribute value from the analysis target data and generating an analysis perspective candidate using the extracted attribute value, and (b) a step of comparing text data in a record including the attribute value extracted as the analysis perspective candidate with text data in a record set that includes at least a record other than the record including the attribute value in the analysis target data, and calculating a characteristic degree indicating a relationship between the analysis perspective candidate and the analysis target data based on a result of the comparison.

(Note 22)

The computer-readable recording medium according to note 21, wherein in step (a), a plurality of attribute values are extracted from the analysis target data, and the analysis perspective candidate is generated using the plurality of attribute values extracted.

(Note 23)

The computer-readable recording medium according to note 21 or 22, wherein in step (b), a topic distribution in the text data in the record including the attribute value extracted as the analysis perspective candidate, as well as a topic distribution in the text data in the record set that includes at least the record other than the record including the attribute value in the analysis target data, is found, and the characteristic degree is calculated such that the more the found topic distributions differ from each other, the larger a value of the characteristic degree is.

(Note 24)

The computer-readable recording medium according to any one of notes 21 to 23, wherein in step (b), a degree of similarity between the text data in the record including the attribute value extracted as the analysis perspective candidate and the text data in the record set that includes at least the record other than the record including the attribute value in the analysis target data is calculated, and the characteristic degree is calculated using the degree of similarity.

(Note 25)

The computer-readable recording medium according to note 21 or 22, wherein in step (b), a characteristic word is extracted from the record including the attribute value extracted as the analysis perspective candidate, and the characteristic degree is calculated using a score of the extracted characteristic word.

(Note 26)

The computer-readable recording medium according to note 21 or 22, wherein in step (b), a characteristic word is extracted from both of the record including the attribute value extracted as the analysis perspective candidate and the record set that includes at least the record other than the record including the attribute value in the analysis target data, a degree of similarity between the extracted characteristic words is calculated, and the characteristic degree is calculated using the degree of similarity.

(Note 27)

The computer-readable recording medium according to any one of notes 21 to 26, wherein in step (a), a plurality of analysis perspective candidates are generated, and for each one of the plurality of analysis perspective candidates, a record that includes the attribute value extracted as the analysis perspective candidate is identified. Furthermore, in step (a), whether or not there is a certain similarity relationship between a record identified for one analysis perspective candidate and a record identified for another analysis perspective candidate is determined, and the one analysis perspective candidate and the other analysis perspective candidate are merged if a result of the determination indicates that there is the certain similarity relationship.

(Note 28)

The computer-readable recording medium according to any one of notes 21 to 27, wherein the program further includes an instruction to cause the computer to execute (c) a step of extracting, from the text data in the record including the attribute value extracted as the analysis perspective candidate, one or both of a characteristic word and representative text as verification information for the analysis perspective candidate, and appending the extracted verification information to the analysis perspective candidate.

(Note 29)

The computer-readable recording medium according to note 21 or 22, wherein in step (b), a statistical test is performed in which a null hypothesis holds when an appearance ratio of a topic that appears in the text data in the record including the attribute value extracted as the analysis perspective candidate is the same as an appearance ratio of a topic that appears in the text data in the record set that includes at least the record other than the record including the attribute value in the analysis target data, and the characteristic degree is calculated such that the smaller a p-value obtained through the statistical test, the larger a value of the characteristic degree.

(Note 30)

The computer-readable recording medium according to note 21 or 22, wherein in step (b), a statistical test is performed in which a null hypothesis holds when an appearance ratio of a characteristic word that appears in the text data in the record including the attribute value extracted as the analysis perspective candidate is the same as an appearance ratio of a characteristic word that appears in the text data in the record set that includes at least the record other than the record including the attribute value in the analysis target data, and the characteristic degree is calculated such that the smaller a p-value obtained through the statistical test, the larger a value of the characteristic degree.

While the invention of the present application has been described with reference to the above embodiments, the invention of the present application is by no means limited to the above embodiments. The configurations and details of the invention of the present application may be subject to various changes that can be understood by a person skilled in the art within a scope of the invention of the present application.

The present application claims the benefit of priority from Japanese Patent Application No. 2012-191067, filed Aug. 31, 2012, the disclosure of which is incorporated herein by reference in its entirety.

INDUSTRIAL APPLICABILITY

As described above, the present invention enables efficient setting of a perspective of analysis that leads to the discovery of knowledge that is unexpected but useful to an analyst in text mining. The present invention is useful in various fields that require text mining, e.g., a field of marketing.

LIST OF REFERENCE NUMERALS 1 data storage device
2 text mining device
3 text mining system
10 analysis target data storage unit
11 analysis perspective data storage unit
20 analysis perspective candidate generation unit
21 characteristic degree calculation unit
110 computer
111 CPU
112 main memory
113 storage device
114 input interface
115 display controller
116 data reader/writer 117 communication interface
118 input device
119 display device
120 recording medium
121 bus

The invention claimed is:

1. A text mining device that uses, as analysis target data, data composed of a set of records including an attribute value and text data, the text mining device realized by a computer and comprising:

hardware, including a processor;

an analysis perspective candidate generation unit implemented at least by the hardware of the computer and that extracts an attribute value from analysis target data and generates an analysis perspective candidate to be used by text mining of the analysis target data, by using the extracted attribute value; and a characteristic degree calculation unit implemented at least by the hardware of the computer and that compares text data in a record including the attribute value extracted as the analysis perspective candidate with text data in a record set that includes at least a record other than the record including the attribute value in the analysis target data, calculates a characteristic degree indicating a relationship between the analysis perspective candidate and the analysis target data based on a result of the comparison, and outputs a combination of analysis perspective candidates and characteristic degrees as an analysis perspective data, wherein the device improves efficiency of text mining, at least by reducing a volume of analysis perspective candidates, and reducing calculation time and required storage capacity, wherein the characteristic degree calculation unit finds a topic distribution in the text data in the record including the attribute value extracted as the analysis perspective candidate and a topic distribution in the text data in the record set that includes at least the record other than the record including the attribute value in the analysis target data, and calculates the characteristic degree such that the more the found topic distributions differ from each other, the larger a value of the characteristic degree is, and wherein the analysis perspective candidate generation unit retrieves all possible combinations of attribute values from each one of the records composing the analysis target data, and uses all of the retrieved combinations as analysis perspective candidates.

2. The text mining device according to claim 1, wherein the characteristic degree calculation unit
finds a topic appearance ratio of the text data in the record including the attribute value extracted as the analysis perspective candidate and a topic appearance ratio of the text data in the record set that includes at least the record other than the record including the attribute value in the analysis target data, and performs a statistical test in which a null hypothesis holds when the found topic appearance ratios are the same, and
calculates the characteristic degree such that the smaller a p-value obtained through the statistical test, the larger a value of the characteristic degree.

3. The text mining device according to claim 1, wherein the characteristic degree calculation unit calculates a degree of similarity between the text data in the record including the attribute value extracted as the analysis perspective candidate and the text data in the record set that includes at least the record other than the record including the attribute value in the analysis target data, and calculates the characteristic degree using the degree of similarity.

4. The text mining device according to claim 1, wherein the characteristic degree calculation unit extracts a characteristic word from the record including the attribute value extracted as the analysis perspective candidate, and calculates the characteristic degree using a score of the extracted characteristic word.

5. The text mining device according to claim 1, wherein the characteristic degree calculation unit extracts a characteristic word from both of the record including the attribute value extracted as the analysis perspective candidate and the record set that includes at least the record other than the record including the attribute value in the analysis target data, calculates a degree of similarity between the extracted characteristic words, and calculates the characteristic degree using the degree of similarity.

6. The text mining device according to claim 1, wherein the analysis perspective candidate generation unit generates a plurality of analysis perspective candidates, identifies, for each one of the plurality of analysis perspective candidates, a record that includes the attribute value extracted as the analysis perspective candidate, determines whether or not there is a certain similarity relationship between a record identified for one analysis perspective candidate and a record identified for another analysis perspective candidate, and merges the one analysis perspective candidate and the other analysis perspective candidate if a result of the determination indicates that there is the certain similarity relationship.

7. The text mining device according to claim 1, further comprising
a verification information extraction unit implemented at least by the hardware of the computer and that extracts, from the text data in the record including the attribute value extracted as the analysis perspective candidate, one or both of a characteristic word and representative text as verification information for the analysis perspective candidate, and appends the extracted verification information to the analysis perspective candidate.

8. A text mining method that uses, as analysis target data, data composed of a set of records including an attribute value and text data, the text mining method comprising:
(a) a step, performed by a computer, of extracting an attribute value from analysis target data and generating an analysis perspective candidate to be used by text mining of the analysis target data, by using the extracted attribute value; and
(b) a step, performed by the computer, of comparing text data in a record including the attribute value extracted as the analysis perspective candidate with text data in a record set that includes at least a record other than the record including the attribute value in the analysis target data, and calculating a characteristic degree indicating a relationship between the analysis perspective candidate and the analysis target data based on a result of the comparison, and outputs a combination of analysis perspective candidates and characteristic degrees as an analysis perspective data,
wherein the text mining improves efficiency of text mining, at least by reducing a volume of analysis perspective candidates, and reducing calculation time and required storage capacity, wherein the step of extracting the attribute value finds a topic distribution in the text data in the record including the attribute value extracted as the analysis perspective candidate and a topic distribution in the text data in the record set that includes at least the record other than the record including the attribute value in the analysis target data, and calculates the characteristic degree such that the more the found topic distributions differ from each other, the larger a value of the characteristic degree is, and wherein the step of comparing the text data retrieves all possible combinations of attribute values from each one of the records composing the analysis target data, and uses all of the retrieved combinations as analysis perspective candidates.

9. A non-transitory computer-readable recording medium having recorded therein a program for performing, with a computer, text mining in which data composed of a set of records including an attribute value and text data is used as analysis target data, the program including an instruction for causing a processor of the computer to execute, when the program is expanded into a memory of the computer:

(a) a step of extracting an attribute value from analysis target data and generating an analysis perspective candidate to be used by text mining of the analysis target data, by using the extracted attribute value; and (b) a step of comparing text data in a record including the attribute value extracted as the analysis perspective candidate with text data in a record set that includes at least a record other than the record including the attribute value in the analysis target data, and calculating a characteristic degree indicating a relationship between the analysis perspective candidate and the analysis target data based on a result of the comparison, and outputs a combination of analysis perspective candidates and characteristic degrees as an analysis perspective data, wherein the program improves efficiency of text mining, at least by reducing a volume of analysis perspective candidates, and reducing calculation time and required storage capacity, wherein the step of extracting the attribute value finds a topic distribution in the text data in the record including the attribute value extracted as the analysis perspective candidate and a topic distribution in the text data in the record set that includes at least the record other than the record including the attribute value in the analysis target data, and calculates the characteristic degree such that the more the found topic distributions differ from each other, the larger a value of the characteristic degree is, and wherein the step of comparing the text data retrieves all possible combinations of attribute values from each one of the records composing the analysis target data, and uses all of the retrieved combinations as analysis perspective candidates.

\* \* \* \* \*